(No Model.)
J. A. DOYLE & T. L. SCEURMAN.
CAR STEP.
No. 331,776. Patented Dec. 8, 1885.
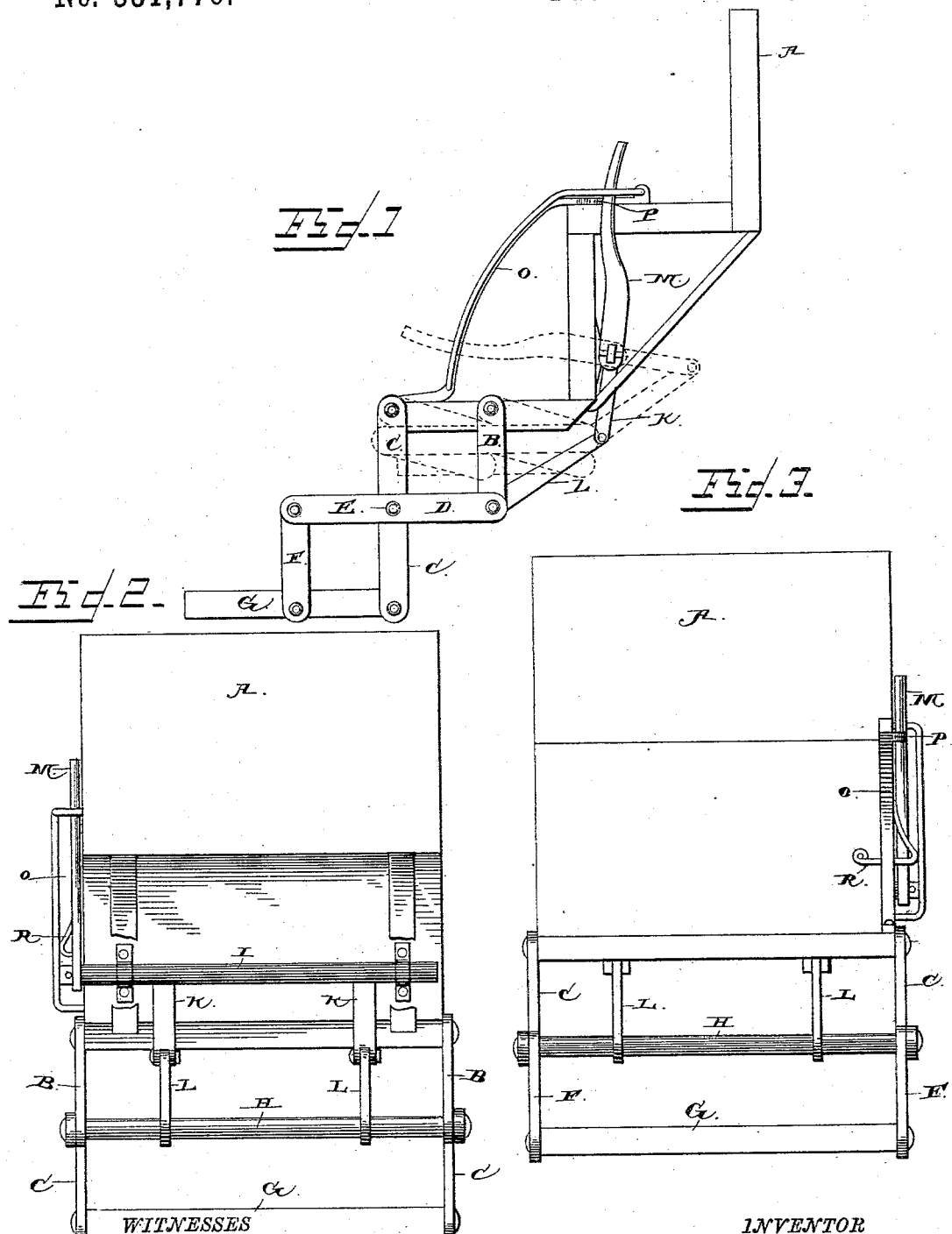
WITNESSES
M. E. Fowler
E. G. Siggers
INVENTOR
J. A. Doyle and
T. L. Sceurman
By C. A. Snow & Co.
their Attorneys

UNITED STATES PATENT OFFICE.

JOHN ALEXANDER DOYLE AND THOMAS LEONARD SCEURMAN, OF PHILIPSBURG, PENNSYLVANIA.

CAR-STEP.

SPECIFICATION forming part of Letters Patent No. 331,776, dated December 8, 1885.

Application filed May 12, 1885. Serial No. 165,237. (No model.)

*To all whom it may concern:*

Be it known that we, JOHN A. DOYLE and THOMAS L. SCEURMAN, citizens of the United States, residing at Philipsburg, in the county of Centre and State of Pennsylvania, have invented a new and useful Improvement in Extension-Steps, of which the following is a specification, reference being had to the accompanying drawings.

Our invention relates to an improvement in extension-steps for the platforms of railway-cars; and it consists in the peculiar construction and combination of devices that will be hereinafter more fully set forth, and particularly pointed out in the claims.

In the accompanying drawings, Figure 1 is a side elevation of an extension-step embodying our invention. Fig. 2 is a rear elevation of the same. Fig. 3 is a front elevation.

A represents the depending steps from the platform of a passenger-car or other vehicle. To the lower of these steps, on the ends thereof, are fulcrumed the rods B and C. To the lower end of the rods B, which are only one-half as long as the rods C, are pivoted rods D, which are fulcrumed to the rods C at the centers, as at E. To the outer ends of the rods D are pivoted short rods F.

G represents a step, which is fulcrumed to the lower ends of the rods C and F, as shown. The rods B, C, D, and F form lazy-tongs, by means of which the step G may be extended out from the steps A or folded up under the bottom of the lower step, as shown in Fig. 1 in dotted lines. The rods B are connected at their lower ends by a shaft, H.

I represents a shaft that is journaled to the steps A, on the rear side thereof, near the lower step, and this shaft I is provided with rock-arms K, to the lower ends of which are fulcrumed arms L, that extend rearwardly from the shaft H. To one end of the shaft I is fixed a hand-lever, M, the free end of which works in a semicircular or curved guideway, O, which is provided at its upper end with rack-teeth P, and near its lower end with a spring rack-tooth or pawl, R. The guideway O is bolted to the steps A at one end, as shown.

By moving the hand-lever M up or down in the guideway the extension-step G may be extended out from under the bottom step A, or drawn up closely under said step, as will be readily understood. When the step G is extended, the hand-lever catches behind the rack tooth or notch P, and when the extension-step is drawn in under the lower step A the free end of the hand-lever catches under the spring-pawl R, and thereby the extension-step is locked in both positions.

An extension-step thus constructed is cheap and simple, and will be found a great convenience on railway-cars and other similar vehicles.

Having thus described our invention, we claim—

1. The combination, with the steps A of a railway-car or other vehicle, of the extension-step G, connected thereto by the lazy-tongs, the shaft H, secured to the lazy-tongs and having the arms L, the shaft I, journaled to the steps A and having the arms K, which are pivoted or fulcrumed to the arms L, and the hand-lever M, substantially as described.

2. The combination, with the steps A of a railway-car or other vehicle, of the extension-step G, connected thereto by the lazy-tongs, the shaft H, secured to the lazy-tongs and having the arms L, the shaft I, journaled to the steps A and having the arms K, which are pivoted or fulcrumed to the arms L, the hand-lever M, and the guideway O, having the rack-tooth P and the spring-pawl R, substantially as described.

In testimony that we claim the foregoing as our own we have hereto affixed our signatures in presence of two witnesses.

JOHN ALEXANDER DOYLE.
THOMAS LEONARD SCEURMAN.

Witnesses:
LORENZO G. RUNK,
WM. E. IRWIN.